Oct. 8, 1957    H. KORDES    2,809,071
LIGHT WEIGHT WHEEL FOR TRACK VEHICLES
Filed Dec. 1, 1953    2 Sheets-Sheet 1
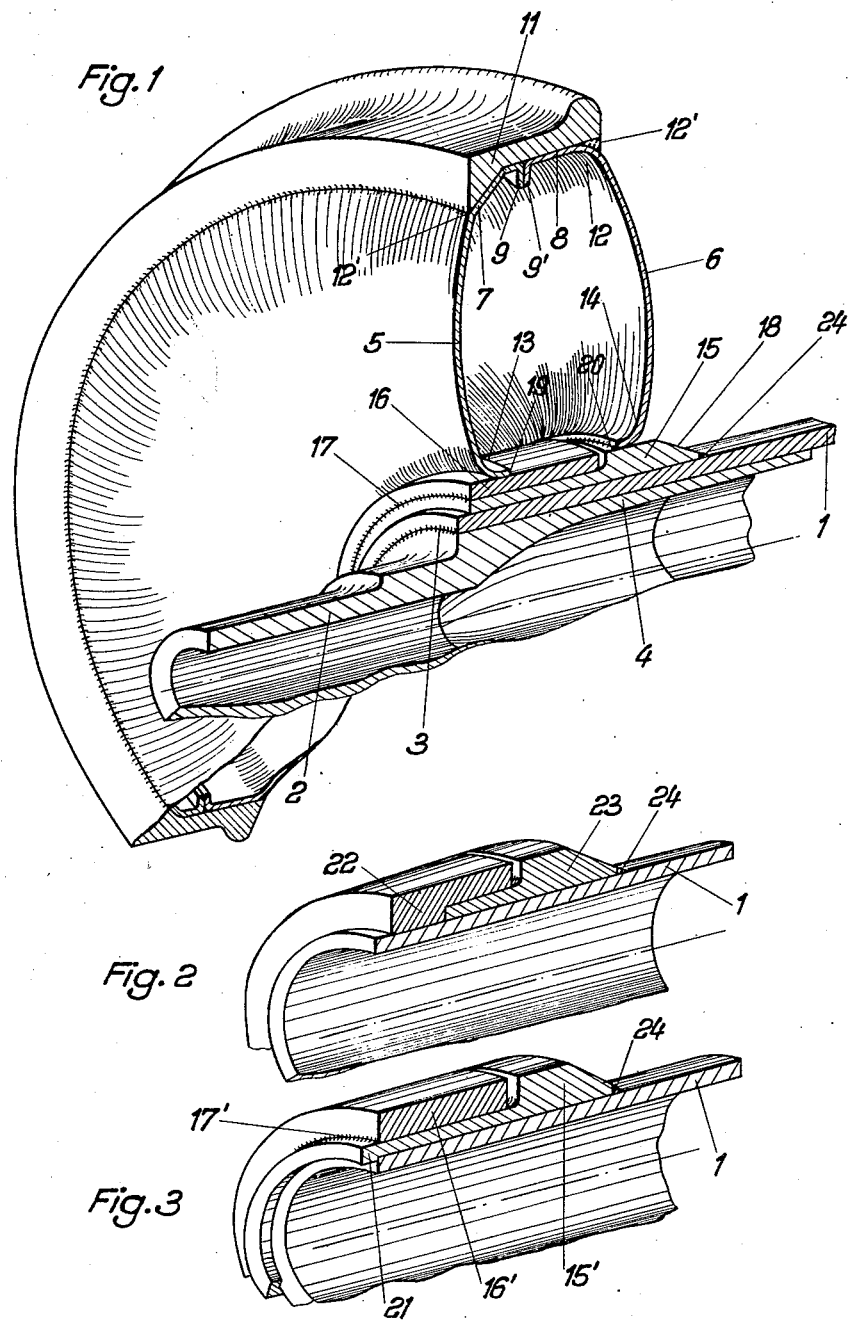
Inventor:
HEINRICH KORDES
By: Young, Emery & Thompson
Att'ys Oct. 8, 1957  H. KORDES  2,809,071
LIGHT WEIGHT WHEEL FOR TRACK VEHICLES
Filed Dec. 1, 1953  2 Sheets-Sheet 2

Inventor:

HEINRICH KORDES
By Young, Emery & Thompson
Attys.

United States Patent Office 2,809,071
Patented Oct. 8, 1957

2,809,071

LIGHT WEIGHT WHEEL FOR TRACK VEHICLES

Heinrich Kordes, Osnabruck, Germany, assignor, by mesne assignments, to Klockner-Georgsmarienwerke A. G., Osnabruck, Germany Application December 1, 1953, Serial No. 395,554

9 Claims. (Cl. 295—16)

The invention relates to a light-weight wheel assembly, particularly for track vehicles, comprising a double-walled disc plate, the individual discs of which are provided with a felloe-like member as well as with a divided hub applied to a hollow axle.

Although in past decades an amount of inventive effort has been devoted to the art of light-weight wheel assemblies, it has not hitherto been possible to reduce the weight of the wheel assembly to the extent necessary or desirable in order to keep within reasonable limits the load imposed on the permanent way by the unsprung masses of the vehicle, and particularly by the wheel assemblies, especially with the very high vehicle speeds obtaining under modern conditions.

The object of this invention is to remove the disadvantages of known wheel assemblies and to provide a light-weight wheel assembly which ensures a noticeable reduction in weight and simultaneously affords optimum radial resiliency and accordingly a reduction of the impact factor with increased lateral rigidity.

According to this invention the above object is achieved by constructing the marginal zones of the individual disc plates of the wheel assembly so that they merge with large radii into the felloe and hub, these transition radii as to their shape and cross section being such that under load they support or assist the resiliency of the convexly curved disc plates and thus act as rolling arcs.

Further features of the invention will be hereinafter explained in connection with the embodiment of the light-weight wheel assembly illustrated in the accompanying drawings, in which:

Fig. 1 is a perspective view, in longitudinal section, of one half of the wheel assembly.

Fig. 2 is also a perspective view, in longitudinal section, of a modified form of hub for the light-weight wheel assembly together with the associated hollow axle, and differs from that according to Fig. 1 in that the hub halves overlap each other in the middle region.

Fig. 3 is a perspective view, in longitudinal section, of a further hub construction which, although essentially similar to that shown in Fig. 1, has an end flange on the inner hub part serving as an abutment.

As shown in Fig. 1, the light-weight wheel assembly according to the invention includes a thin-walled tube 1 made of steel or a light metal which together with the axle end 2 inserted therein constitutes the hollow axle of the wheel assembly. The tube and axle end are spot welded or continuously welded together at 3 along lateral surfaces thereof. The part 4 of the axle end lying within the tube 1 has such a cross section that the desired pressure distribution is achieved and the vulnerable cross section after assembly of the wheel parts is located at places subjected to less load.

Figure 4:
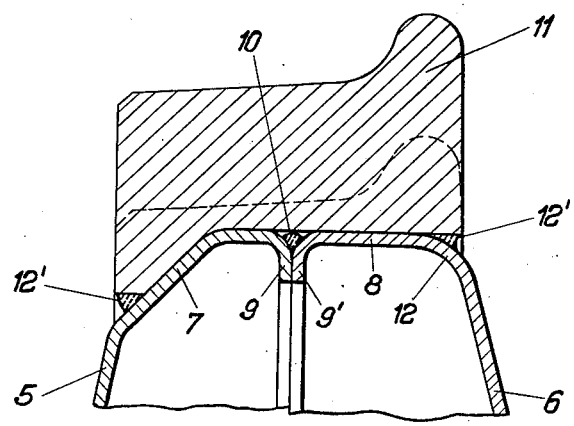
Fig. 4 is a cross sectional view of the wheel tire and the adjoining part of the wheel disc.

The wheel body proper comprises two outwardly or convexly curved disc plates 5 and 6 which terminate at their upper ends in felloe-like members 7 and 8, see particularly Fig. 4. The ends of these felloe members are bent to form annular flanges 9 and 9' which are connected together at their abutting faces, as for example by spot welding 10. The flanges serve materially to strengthen the wheel body in the radial direction. The outer felloe member 7 of each wheel body is inclined or chamfered so that a supporting surface for the tire 11 is obtained capable of absorbing transverse forces acting on the wheel assembly. The tire 11 is, as usual, shrunk or pressed on to the wheel body and united therewith by welding, as indicated at 12'.

Essentially according to the invention the marginal zones of the disc plates, particularly at the areas 12, 13 and 14, merge with large transition radii into the felloe members 7, 8 and into the wheel hub and as a consequence act under load as regular rolling arcs so that in combination with the convex curvature of the disc plates optimum properties of resiliency of the system are produced as an end effect, this not having been attained hitherto. By adopting the described features according to the invention, the main defects of known double-walled wheel bodies, viz., their defective capacity for resilience, are for the first time removed and simultaneously the advantages of this wheel body construction, i. e. its extraordinarily high bearing strength, are made use of for the purpose of achieving maximum reduction in weight.

As to the increase of the spring power of the entire wheel it is explained that the spring power of the wheel is improved as to its entirety due to the bowed configuration of the disc plates which are concavo-convex in cross section with the bowed part extended outwardly. This is obvious when it is considered that the bowed disc plates upon heavy load on the wheel, results in a shifting of the forces from the disc plates to the adjacent zones of the hub.

In this connection, the construction of the hub itself according to the invention provides special advantages.

The construction of this hub may, in detail, be varied. In Fig. 1, for example, a two-part hub is illustrated as comprising concentric hub parts 15 and 16, which overlap for the entire length of part 16 and are firmly united together by friction. Both hub parts may be united by welding at lateral surfaces as indicated at 17. The chamfered surface 18 on the inner hub part 15 affords gradual transference of pressure to axle tube 1 and avoidance of pressure peaks. The disc plates 5 and 6 are firmly united with the two hub parts 16 and 15 respectively by means of welding seams 19 and 20.

The construction of hub according to Fig. 3 differs from that previously described only by the fact that the inner hub part 15' is extended beyond one end of the sleeve part 16' and is provided with a collar 21 which abuts against one end of the tube 1. The hub parts 15' and 16' are preferably welded together at 17'.

Fig. 2 illustrates a further hub construction in which the middle portions of the two hub parts 22 and 23 overlap each other so that the hub part 22 partly bears directly against the tube 1. In all three hub constructions, the hub may be united with the tube 1 by welding for example as indicated at 24.

In the construction of hub and hollow axle according to the invention, the axle end 2, hollow axle 1 and the parts 15, 16 (or 15', 16' and 22, 23) constitute a resilient unit comprising four concentric super-imposed layers which, with suitable dimensions and shaping, exhibits a compensated pressure distribution which is practically rectilinear over its entire length. The material employed in the construction is accordingly utilised to an optimum degree so that an extremely low specific gravity with a maximum bearing strength is achieved.

Figure 5:
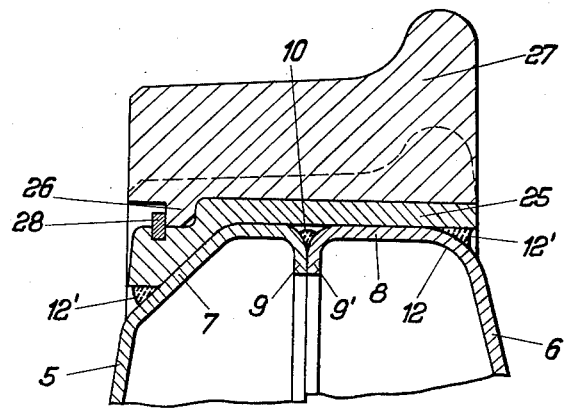
Fig. 5 is a cross sectional view similar to Fig. 4 but showing, however, a new tire applied to the wheel body.

Fig. 5 illustrates an advantageous way of replacing a tire on a worn wheel body. As can be seen from this figure, the worn tire, whose worn surface is indicated by dotted lines, is first of all machined so that a residual part 25 serving as an auxiliary felloe is left. As indicated at the left hand side of the figure, this residual part is stepped to provide a counter-bearing for the collar 26 of the new tire 27. After the tire 27 has been applied, it is retained in known manner against latereral displacement and also wandering by a sprung-in ring 28. Adequate firmness of seating of the new tire is obtained owing to the above described resilient construction of the wheel body and is further assured owing to the aging of the residual part 25.

In order to reduce the running noise of the wheel body as much as possible, it is preferred to provide it and, if desired, the axle also with a sound-absorbing medium both internally and externally, said medium being applied by spraying or by an electrostatic method. In many cases it may be sufficient to fill the inner hollow space of the wheel body and/or the axle with a cushion or padding of sound-absorbing materials.

I claim:

1. A light-weight wheel particularly for track vehicles comprising a pair of spaced disc plates curved outwardly relative to each other to form a double-walled disc body, a hollow axle, a hub mounted on the axle and having the double-walled disc body mounted thereon, the spaced disc plates having outer felloe members and inner hub engaging members, and each disc plate having marginal curved zones merging into the felloe member and hub engaging member, so that without changing the direction of curvature of the disc plates the latter at the place of transition gradually merge into the felloe members and the hub engaging members to thus increase the spring power of the entire wheel.

2. A light-weight wheel assembly according to claim 1, including a welded connection provided between the disc plates in the felloe region and a welded connection provided between the hub and the ends of said disc plates remote from the felloe region.

3. A light-weight wheel assembly for track vehicles, comprising a pair of outwardly curved disc plates forming a double-walled disc body, a felloe member formed by said plates, an annular stiffening flange formed by bending radially inwards the adjacent ends of said felloe member, a welded connection between said ends, a hollow axle, a divided hub mounted on said axle, a welded connection between said hub and the ends of said disc plates remote from said felloe member, said disc plates including marginal zones of large radii merging into said felloe member and divided hub, whereby when the wheel assembly is under load said zones assist the capacity for resilience of said outwardly curved disc plates.

4. A light-weight wheel assembly according to claim 3, in which said hub comprises superimposed sleeve layers, of which the inner sleeve layer includes an outer surface extending at an acute angle towards said hollow axle.

5. A light-weight wheel assembly according to claim 3, in which said hollow axle comprises a tube and an axle end inserted in said tube and in which said hollow axle and divided hub comprise together four concentric superimposed layers welded together to provide a resilient unitary body, whereby a compensated pressure distribution is obtained extending substantially rectilinearly over the entire length of said unitary body.

6. A light-weight wheel assembly for track vehicles, comprising a pair of outwardly curved disc plates forming a double-walled disc body, a felloe member formed by said disc plates, an annular stiffening flange formed by bending radially inwards the adjacent ends of said felloe member, a welded connection between said ends, a hollow axle, a divided hub mounted on said axle, a welded connection between said hub and the ends of said disc plates remote from said felloe member, said disc plates including marginal zones of large radii merging into said felloe member and divided hub, whereby when the wheel assembly is under load said zones assist the capacity for resilience of said outwardly curved disc plates, said hollow axle including a tube and an axle end inserted in said tube and forming with said divided hub four concentric superimposed layers welded together to provide a resilient unitary body, whereby a compensated pressure distribution is obtained extending substantially rectilinearly over the entire length of said unitary body, and the outer of said two disc plates including a bevelled portion in the felloe region to serve as a supporting surface for the wheel tire capable of absorbing the transverse forces acting on the wheel assembly.

7. A light-weight wheel assembly according to claim 6, in which the part of the axle end inserted in said axle tube has a cross sectional area which uniformly diminishes towards the middle of the wheel assembly.

8. A light-weight wheel assembly according to claim 6, in which the hub is composed of individual layers welded together at lateral surfaces thereof.

9. A light-weight wheel assembly according to claim 6, in which said axle end and axle tube are welded together at lateral surfaces thereof.

References Cited in the file of this patent

UNITED STATES PATENTS

| | | |
|---|---|---|
| 141,011 | Paige | July 22, 1873 |
| 362,111 | Rigby | May 3, 1887 |
| 409,708 | Rigby | Aug. 27, 1889 |
| 464,527 | Smith | Dec. 8, 1891 |
| 875,455 | Price | Dec. 31, 1907 |
| 1,253,271 | Moore | Jan. 15, 1918 |
| 1,519,029 | Gollwitzer | Dec. 9, 1924 |
| 2,190,125 | Sembdner | Feb. 13, 1940 |
| 2,397,719 | Ash | Apr. 2, 1946 |

FOREIGN PATENTS

| | | |
|---|---|---|
| 401,444 | Great Britain | Nov. 16, 1933 |
| 408,680 | Great Britain | Apr. 16, 1934 |